US012594842B2

(12) United States Patent
Janssens et al.

(10) Patent No.: US 12,594,842 B2
(45) Date of Patent: Apr. 7, 2026

(54) SYSTEM AND METHOD FOR ELECTRIC MACHINE PEAK POWER MANAGEMENT

(71) Applicant: Dana Belgium N.V., Bruges (BE)

(72) Inventors: Jerome Janssens, Braine-le-château (BE); Bert Hannon, Bruges (BE); Christophe De Buyser, Veldegem (BE); Koen B. Seynaeve, Veldegem (BE); Kevin Vyncke, Deinze (BE)

(73) Assignee: DANA BELGIUM, Bruges (BE)

( * ) Notice: Subject to any disclaimer, the term of this patent is extended or adjusted under 35 U.S.C. 154(b) by 75 days.

(21) Appl. No.: 18/649,752

(22) Filed: Apr. 29, 2024

(65) Prior Publication Data

US 2025/0145016 A1    May 8, 2025

Related U.S. Application Data

(60) Provisional application No. 63/595,995, filed on Nov. 3, 2023.

(51) Int. Cl.
B60L 15/20 (2006.01)

(52) U.S. Cl.
CPC ......... B60L 15/20 (2013.01); B60L 2240/423 (2013.01); B60L 2240/425 (2013.01); B60L 2240/526 (2013.01); B60L 2250/26 (2013.01)

(58) Field of Classification Search
CPC .............. B60L 2240/423; B60L 15/20; B60L 2240/425; B60L 2240/526; B60L 2250/26
See application file for complete search history.

(56) References Cited

U.S. PATENT DOCUMENTS

| | | | | |
|---|---|---|---|---|
| 4,292,531 A * | 9/1981 | Williamson | ............ | B60L 50/13 |
| | | | | 318/158 |
| 7,653,474 B2 * | 1/2010 | Cawthorne | ........... | B60W 20/10 |
| | | | | 701/99 |
| 8,049,358 B2 * | 11/2011 | Crane | .................... | B63H 23/24 |
| | | | | 307/9.1 |
| 8,447,491 B2 * | 5/2013 | Templin | ................ | B60W 30/20 |
| | | | | 701/99 |
| 10,273,019 B2 * | 4/2019 | Sands | .................... | B64D 27/33 |
| 2021/0387528 A1 * | 12/2021 | Thompson | ................ | B60L 1/00 |

* cited by examiner

*Primary Examiner* — Gertrude Arthur Jeanglaude
(74) *Attorney, Agent, or Firm* — McCoy Russell LLP

(57) ABSTRACT

Methods and systems for controlling a maximum power output of an electric propulsion system are described. In one example, a state machine generated from executable instructions controls a maximum power output of an electric propulsion systems. The state machine permits additions states and changes to conditions that facilitate transitioning between the various states without having to completely reconstruct the maximum power output method.

19 Claims, 5 Drawing Sheets

SYSTEM AND METHOD FOR ELECTRIC MACHINE PEAK POWER MANAGEMENT

CROSS REFERENCE TO RELATED APPLICATION

The present application claims priority to U.S. Provisional Application No. 63/595,995, entitled "SYSTEM AND METHOD FOR ELECTRIC MACHINE PEAK POWER MANAGEMENT", and filed on Nov. 3, 2023. The entire contents of the above-listed application are hereby incorporated by reference for all purposes.

TECHNICAL FIELD

The present disclosure relates to managing peak output power of an electric propulsion system. The electric propulsion system may be part of an electric vehicle or a hybrid vehicle.

BACKGROUND AND SUMMARY

Electrically propelled vehicles may operate continuously at and below continuous rated operating conditions. The continuous rated operation may be a function of several operating conditions that may include but are not limited to load (e.g., driver demand load), component temperatures, and cooling system capacity. If components of an electric propulsion system (e.g., inverter, cables, electric machine, etc.) operate above the continuous rated operating conditions, degradation of the electric propulsion may result. However, an electric propulsion system may also operate above its continuous operating conditions for a period of time without system degradation occurring. The period of time may be dependent on the propulsion system operating conditions and the specifications of the electric propulsion system. It may be desirable to operate the electric propulsion system above its continuous rated operating conditions for less than the period of time to increase vehicle drivability and performance. For example, it may be desirable to operate the electric propulsion system above continuous rated operation during gear shifting or when passing another vehicle. Individual components of a propulsion system may include hardware or software monitors to enforce electric propulsion system operating constraints, but programming an electric propulsion system may be complex and difficult to understand when there are a large number of inputs and conditions to be considered. Further, updating and diagnosing an electric propulsion system that may include many inputs and conditional statements may be difficult and time-consuming.

The inventors herein have recognized the above-mentioned issues and have developed an electric propulsion system, comprising: an electric machine; an inverter electrically coupled to the electric machine; and one or more controllers including executable instructions that cause the controller to generate a state machine configured to control maximum power output of the electric propulsion system, where the state machine be in exactly one of a plurality of states at a time, and where the plurality of states include at least one state that permits output power of the electric propulsion system to exceed a continuous rated output power of at least one component of the electric propulsion system and at least one state that permits output power of at least one component of the electric propulsion system to be constrained to less than the continuous rated output of the at least one component.

By controlling maximum output power of an electric propulsion system via a state machine, it may be possible to provide the technical result of creating a power control system that is relatively simple to scale and revise for system upgrades. In addition, the state machine may allow operation of the power control system to be more easily understood and diagnosed while the electric propulsion system is in use.

The present description may provide several advantages. In particular, the approach may make it possible to simplify design of electric propulsion system power control. Further, the approach allows system diagnostics to be performed in a way that allows a technician to more easily assess system operation. Additionally, the state machine allows additional states to be added without enormous effort.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
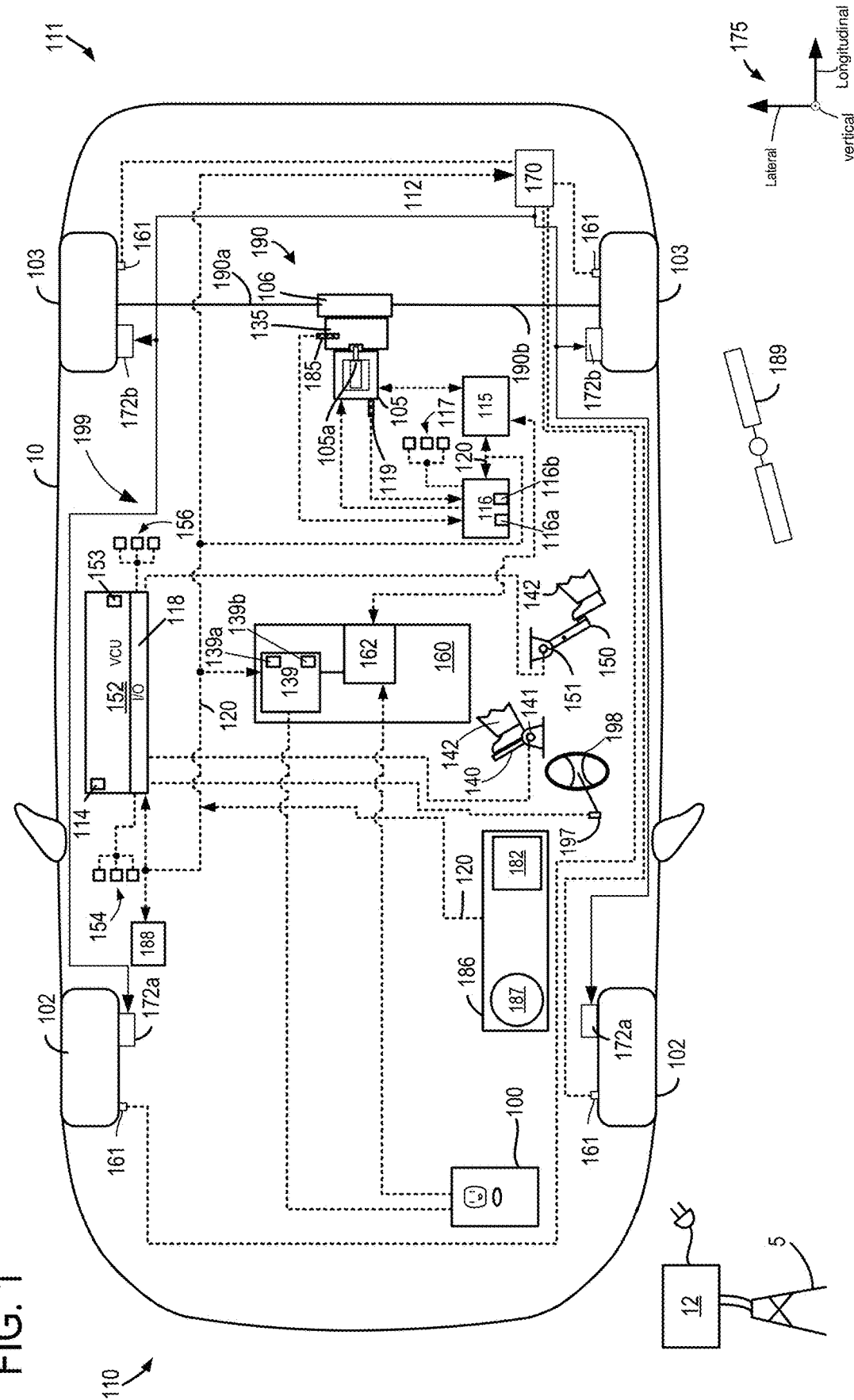
FIG. 1 is an illustration of an example vehicle that includes an electric vehicle propulsion system.
Figure 2A:
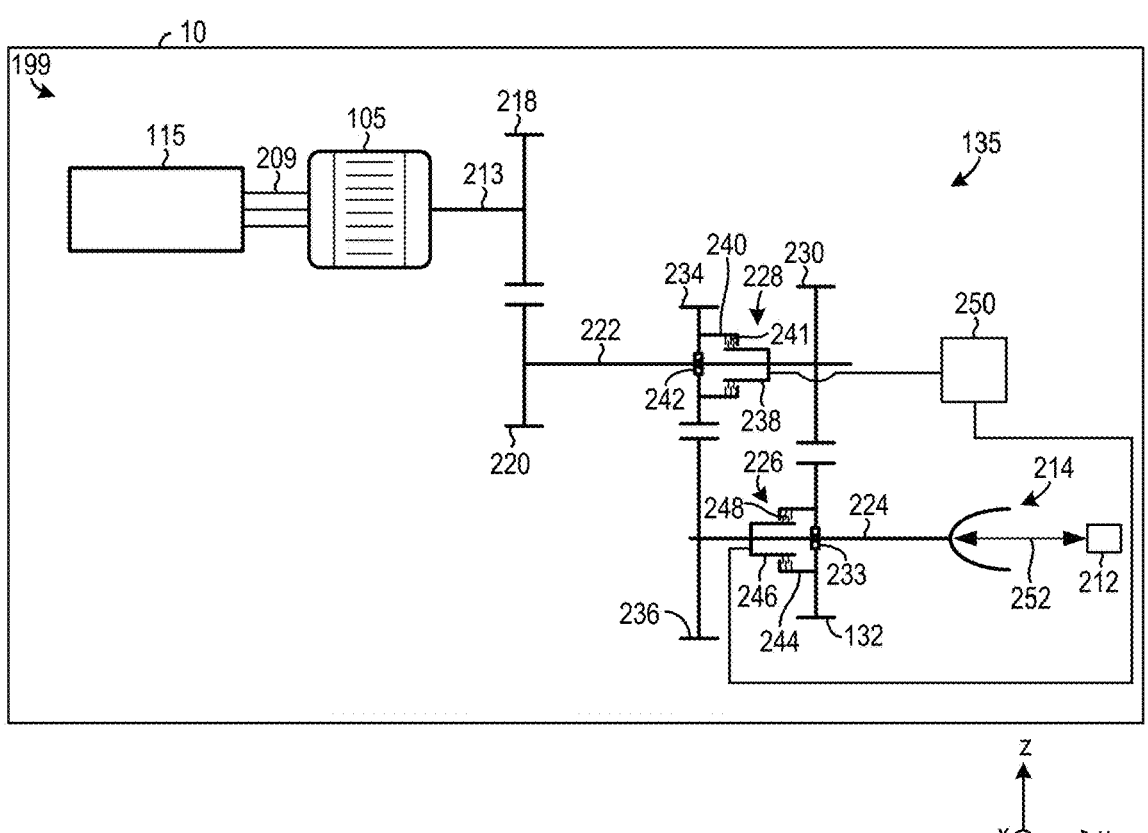
FIGS. 2A-2C show one example electric vehicle configuration.
Figure 2B:
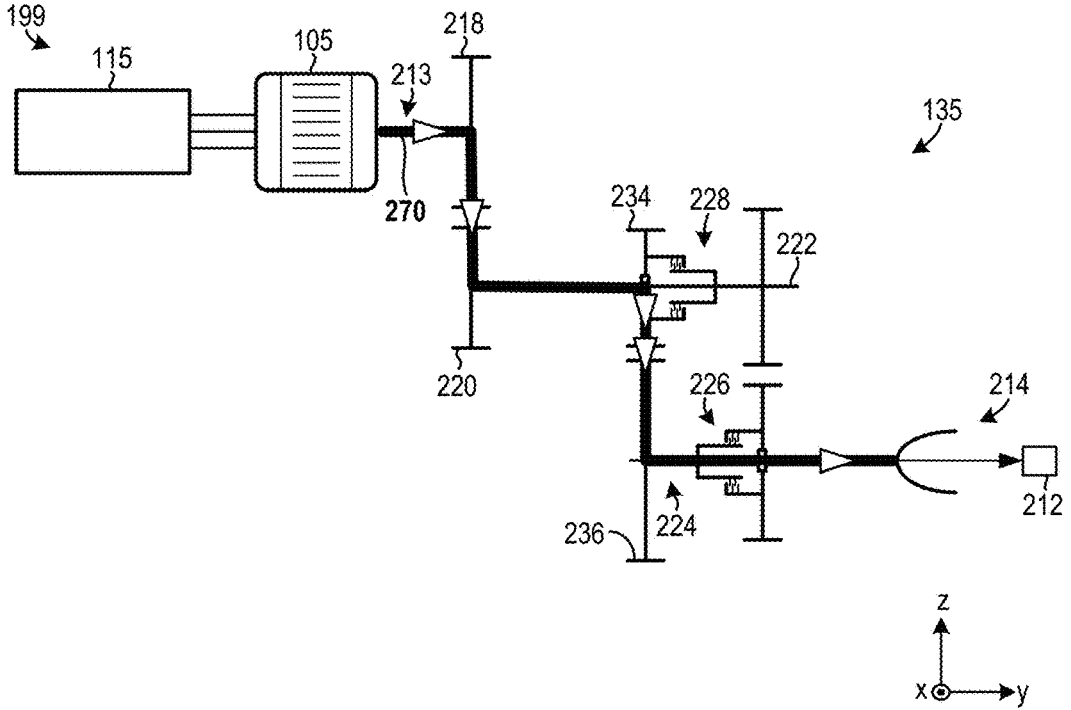
Figure 2C:
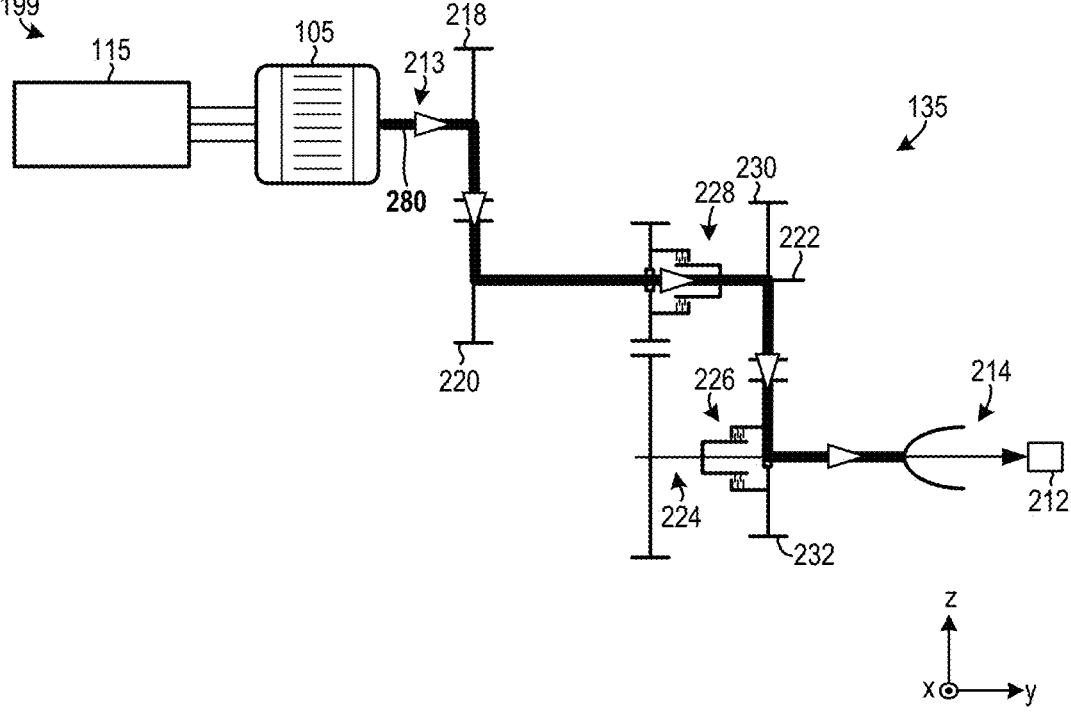
Figure 3:
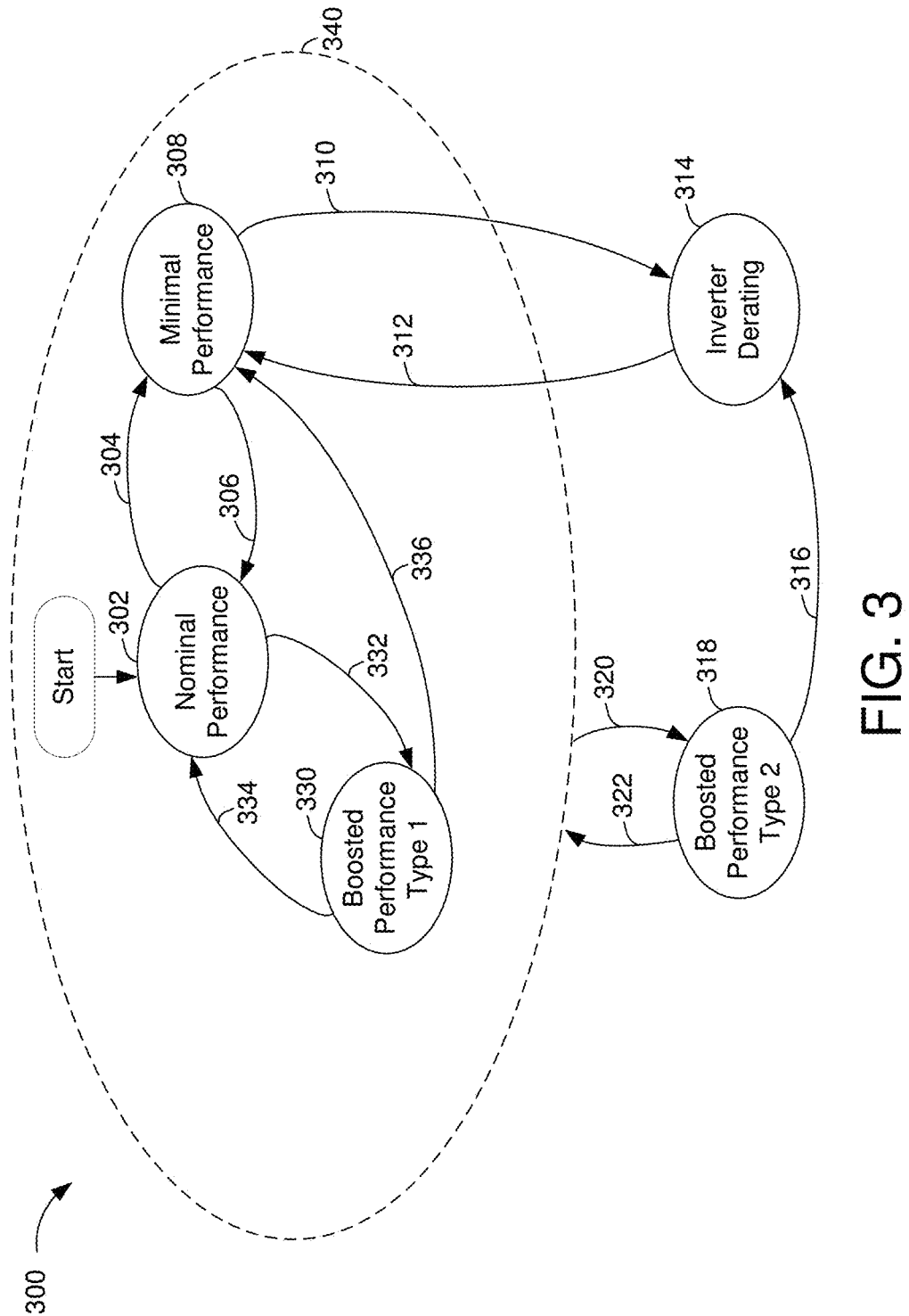
FIG. 3 shows example state machine for controlling maximum output power of an electric propulsion system.
Figure 4:
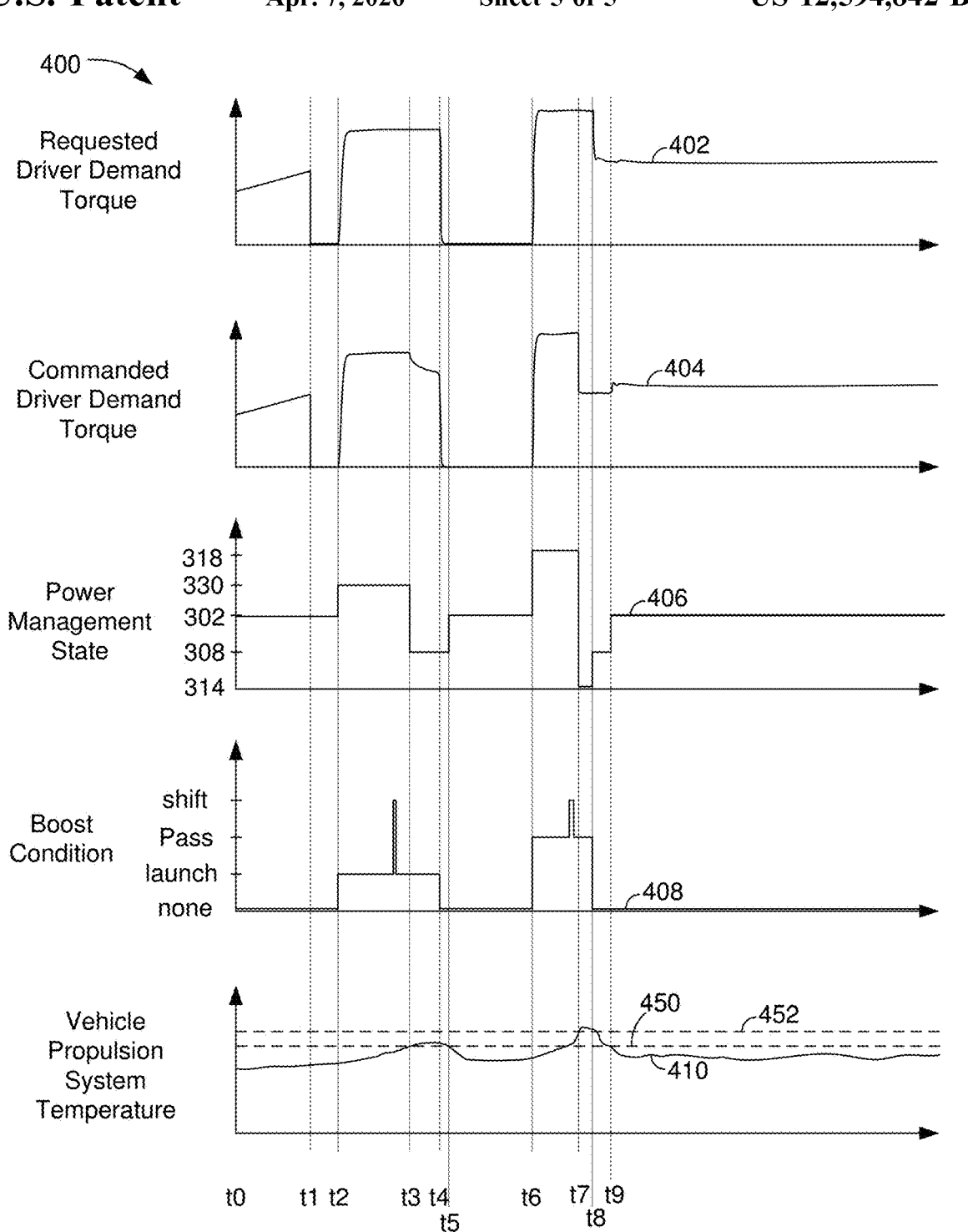
FIG. 4 show example vehicle operating sequence according to the state machine of FIG. 3 and the system of FIGS. 1-2C.

A method and system for controlling maximum or peak power output of an electric propulsion system for a vehicle are described. The electric propulsion system may be incorporated in an electric vehicle or a hybrid vehicle. In one example, the electric propulsion system is incorporated in a vehicle as shown in FIG. 1. FIGS. 2A-2C show an example driveline for a vehicle with an electric propulsion system. A state machine for controlling maximum output power for an electric propulsion system is shown in FIG. 3. An example of a maximum power output control sequence for an electric propulsion system according to the state machine of FIG. 3 is shown in FIG. 4.

FIG. 1 illustrates an example vehicle propulsion system 199 for vehicle 10. In FIG. 1 mechanical connections between the various components are illustrated as solid lines, whereas electrical connections between various components are illustrated as dashed lines. Vehicle front end is indicated at 110 and vehicle rear end is indicated at 111. Vehicle 10 travels in a forward direction when vehicle front end 110 leads movement of vehicle 10. Vehicle 10 travels in a reverse direction when vehicle rear end 111 leads movement of vehicle 10. In this example, vehicle 10 is a rear wheel drive vehicle, but in other examples, vehicle 10 may be a four-wheel drive or front wheel drive vehicle.

Vehicle propulsion system 199 includes a propulsion source 105 (e.g., an electric machine, such as a motor), but in other examples two or more propulsion sources may be provided. In one example, propulsion source 105 may be a synchronous or induction electric machine that may operate as a motor or generator. In other examples, propulsion source 105 may be a direct current (DC) machine. Vehicle propulsion system 199 also includes a transmission 135. The propulsion source 105 is fastened to the transmission 135 and transmission 135 delivers power from its rotor 105a to transmission 135. Transmission 135 may be mechanically coupled to differential gears 106. Differential gears 106 may be coupled to two axle shafts, including a first or right axle shaft 190a and a second or left axle shaft 190b. Vehicle 10 further includes front wheels 102 and rear wheels 103.

The transmission 135 may be referred to as a step ratio transmission and it may be configured as shown in greater detail in FIGS. 2A-2C, or alternatively, a different configuration. Transmission 135 may include one or more clutch actuators (not shown) to shift one or more clutches. Transmission 135 may include a first speed sensor 119 for sensing a speed of propulsion source 105 and a second speed sensor 185 for sensing a transmission output shaft speed. Electric power inverter 115 is electrically coupled to propulsion source 105 to convert DC power to alternating current (AC) and vise-versa. Powertrain controller 116 is electrically coupled to sensors 117 and actuators of vehicle propulsion system 199. For example, sensors 117 may include, but are not limited to inverter switch temperature sensors, electric machine winding temperature sensors, bus bar temperature sensors, etc.

Transmission 135 may transfer mechanical power to or receive mechanical power from differential gears 106. Differential gears 106 may transfer mechanical power to or receive mechanical power from rear wheels 103 via right axle shaft 190a and left axle shaft 190b. Propulsion source 105 may consume alternating current (AC) electrical power provided via electric power inverter 115. Alternatively, propulsion source 105 may provide AC electrical power to electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from propulsion source 105. Electric power inverter 115 may convert the AC electrical power from propulsion source 105 into DC power to store in battery 160.

Propulsion source 105 may transfer mechanical power to or receive mechanical power from transmission 135. As such, transmission 135 may be a multi-speed gear set that may shift between gears when commanded via powertrain controller 116. Powertrain controller 116 includes a processor 116a and memory 116b. Memory 116b (e.g., storage media) may include read exclusive memory, random access memory, and keep alive memory. The memory may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the stationary power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139a and memory 139b (e.g., random-access memory, read-exclusive memory, and keep-alive memory).

Vehicle 10 may include a vehicle control unit (VCU) 152 that may communicate with electric power inverter 115, powertrain controller 116, friction or foundation brake controller 170, global positioning system (GPS) 188, BMS controller 139, and dashboard 186 and components included therein via controller area network (CAN) 120. VCU 152 includes memory 114, which may include read-exclusive memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not constrained to inverters, transmission controllers, display devices, human/machine interfaces, friction braking systems, and battery controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 186 that an operator of the vehicle may interact with. Dashboard 186 may include a display system 187 configured to display information to the vehicle operator. Display system 187 may comprise, as a non-restricting example, a touchscreen, or human machine interface (HMI), display which enables the vehicle operator to view graphical information as well as input commands. In some examples, display system 187 may be connected wirelessly to the internet (not shown) via VCU 152. As such, in some examples, the vehicle operator may communicate via display system 187 with an internet site or software application (app) and VCU 152.

Dashboard 186 may further include an operator interface 182 via which the vehicle operator may adjust the operating status of the vehicle. Specifically, the operator interface 182 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 182 may include interfaces that utilize a physical apparatus, such as a key, that may be inserted into the operator interface 182 to activate the vehicle propulsion system 199 including propulsion source 105 and to turn on the vehicle 10. The apparatus may be removed to shut down the transmission 135 and propulsion source 105 to turn off vehicle 10. Propulsion source 105 may be activated via supplying electric power to propulsion source 105 and/or electric power inverter 115. Propulsion source 105 may be deactivated by ceasing to supply electric power to propulsion source 105 and/or electric power inverter 115. Still other examples may additionally or optionally use a start/stop button that is manually pressed by the operator to start or shut down the propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the inverter 115 and propulsion source 105. Spatial orientation of vehicle 10 is indicated via axes 175.

Vehicle 10 is also shown with a foundation or friction brake controller 170. Friction brake controller 170 may selectively apply and release friction brakes (e.g., 172a and 172b) via allowing hydraulic fluid to flow to the friction brakes. The friction brakes may be applied and released so as to avoid locking of the friction brakes to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand wheel torque, or alternatively a driver demand wheel power, via applying driver demand pedal 140 or via supplying a driver demand wheel torque/power request to vehicle control unit 152. Vehicle control unit 152 may then demand a torque or power from propulsion source 105 via commanding powertrain controller 116. Powertrain controller 116 may command electric power inverter 115 to deliver the driver demand wheel torque/power via electrified axle 190 and propulsion source 105. Electric power inverter 115 may convert DC electrical power from battery 160 into AC power and supply the AC power to propulsion source 105. Propulsion source 105 rotates and transfers torque/power to transmission 135. Transmission 135 may supply torque from propulsion source 105 to differential gears 106, and differential gears 106 transfer torque from propulsion source 105 to rear wheels 103 via axle shafts 190a and 190b.

During conditions when the driver demand pedal is fully released, vehicle control unit 152 may request a small negative or regenerative braking power to gradually slow vehicle 10 when a speed of vehicle 10 is greater than a threshold speed. The amount of regenerative braking power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle control unit 152 may request that a first portion of the driver demanded braking power be generated via propulsion source 105 via commanding powertrain controller 116. Additionally, vehicle control unit 152 may request that a portion of the driver demanded braking power be provided via friction brakes 172 via commanding friction brake controller 170 to provide a second portion of the driver requested braking power.

After vehicle control unit 152 determines the braking power request, vehicle control unit 152 may command powertrain controller 116 to deliver the portion of the driver demand braking power allocated to propulsion source 105. Propulsion source 105 may convert the vehicle's kinetic energy into AC power.

Powertrain controller 116 includes predetermined transmission gear shift schedules whereby fixed ratio gears of transmission 135 may be selectively engaged and disengaged. Shift schedules stored in powertrain controller 116 may select gear shift points or events as a function of driver demand wheel torque and vehicle speed.

Turning now to FIG. 2A, FIG. 2A shows a first example of vehicle propulsion system 199. The vehicle 10 may for example be a passenger vehicle, commercial vehicle, or an off-highway vehicle such as a wheel loader, an excavator, a dumper, a material handling vehicle, a tractor, a harvester, a mining vehicle, or the like. An off-highway vehicle is vehicle whose size, weight, and/or top speed precludes it from being driven on highways and other roadways, in some cases. The vehicle propulsion system 199 includes a propulsion source 105 and a transmission 135. In the illustrated example, the propulsion source 105 propulsion source 105 is electrically coupled to an inverter 115 via an electrical connection 209 (e.g., multi-phase wires, bus bars, combinations thereof, and the like). As such, the propulsion source 105 is an alternating current (AC) type motor in the illustrated example. To elaborate, the traction motor may be a multi-phase (e.g., three or more phases) AC motor. In one specific use case example, the propulsion source may be a three phase AC motor. However, in alternate examples, a direct current (DC) propulsion source may be used in the vehicle propulsion system 199.

The inverter 115 may be electrically connected to battery 160. As such, electrical energy may flow between the inverter 115 and the battery 160 during drive operation and regeneration operation, when the propulsion source 105 is operated as a motor.

Vehicle propulsion system 199 may further include one or more drive axle assemblies 212 that are mechanically coupled to output interface(s) 214 which may be included in the transmission 135. The drive axle assembly may be a rear drive axle assembly, in one example. The drive axle assembly may include differentials, axle shafts (e.g., half shafts) coupled to the associated differential, drive wheels coupled to the axle shafts), and the like. The drive wheels may be mounted on wheel hubs and may contact a driving surface while the vehicle is in operation.

The propulsion source 105 may include components such as a rotor and a stator that electromagnetically interact during operation to generate motive power. Further in one example, the motor may be a motor-generator which is designed to generate electrical energy during regeneration operation.

The transmission 135 may include an input shaft 213 that is mechanically coupled (e.g., directly mechanically coupled) to a rotor shaft in the propulsion source 105. Splines, bolts and flanges, combinations thereof, and/or the like may be used to form the mechanical connection between the rotor shaft and the input shaft 213. Inputs and outputs of the transmission 135 generally denote the power flow occurring while the vehicle is operating under a drive condition where mechanical power is transferred from the traction motor to the drive wheels to propel the vehicle in a desired direction (e.g., forward drive direction or reverse drive direction). However, it will be appreciated that during regeneration operation, the mechanical power flow occurs in the reverse direction (e.g., from the drive wheels to the traction motor).

In the illustrated example, the input shaft 213 has a gear 218 fixedly coupled thereto. Fixedly coupling the components allows both components to co-rotate. Further, as illustrated, the gear 218 meshes with a gear 220 on a shaft 222 (e.g., idler shaft). The gear 220 is fixedly coupled to the shaft 222. However, other gear layouts and/or other mechanical connections may be established between the input shaft and the idler shaft, in other examples.

The transmission 135 further includes an output shaft 224 in the illustrated embodiment. A first friction clutch 228 may be mounted to the shaft 222. A second friction clutch 226 may be mounted to the output shaft 224. The second friction clutch 226 may be associated with a second operating gear ratio formed between a gear 230 and a gear 232. The gear 232 may be idly mounted to the output shaft 224 via a bearing 233. As such, when the second friction clutch 226 is disengaged, the gear 232 and the output shaft 224 can independently rotate. Likewise, the first friction clutch 228 may be associated with a first operating gear ratio formed between a gear 234 and a gear 236. The second operating gear ratio may be greater than the first operating gear ratio. As such, the first operating gear ratio may be used at vehicle launch and during lower speed maneuvers. Conversely, the second operating gear ratio may be used during higher speed maneuvers. However, in other examples, the first operating gear ratio may be greater than the second operating gear ratio.

The first friction clutch 228 may include an inner plate carrier 238 (e.g., a hub) that is fixedly coupled to the shaft 222 and an outer plate carrier 240 (e.g., a drum) that is fixedly coupled to the gear 234. The plate carriers each may include sets of plates 241 that are designed to frictionally engage and disengage during clutch closing and opening, respectively. To elaborate, the plates (e.g., friction and spacer discs) may be interleaved to allow selective torque transfer therethrough. For example, the plates may be splined to the carriers. However, other attachment techniques for the plates and carriers have been contemplated. The gear 234 may be idly mounted on the shaft 222. For example, a bearing 242 may be used to idly mount the gear 234 to the shaft 222. The bearings described herein may include outer races, inner races, roller elements (e.g., balls, cylinders, tapered cylinders, and the like). Idly mounting refers to the attachment of a gear to a shaft such that the gear and shaft are able to independently rotate. The gear 234 meshes with the gear 236 that is fixedly coupled to the output shaft 224, in the illustrated example.

The second friction clutch 226 may include an outer plate carrier 244 that is fixedly coupled to the gear 232, an inner plate carrier 246 that is fixedly coupled to the output shaft 224, and plates 248 in both of the carriers. As such, the second friction clutch 226 may have a similar construction to the first friction clutch 228.

The friction clutches 226, 228 may be wet friction clutches to reduce the temperature of the clutches during shifting events, to reduce the chance of the clutches experiencing over temperature conditions. The friction clutches 226, 228 may therefore, in such an example, receive lubricant (e.g., natural and/or synthetic oil) from a lubrication system 250. The lubrication system 250 may include a sump that collects the lubricant, a pump, lines, conduits, valves, and the like that route lubricant to the clutches and other components with lubrication needs such as bearings, gears, and the like, for example. Still further, the lubrication system 250 may in one example be designed with hydraulic actuation circuits that enable the friction clutches to be hydraulically actuated. For example, the friction clutches may include hydraulically actuated pistons that are in fluidic communication with the actuation circuit. However, in other examples, the hydraulic actuation circuits may be formed in a separate system that is distinct from the lubrication system or the friction clutches may be electro-mechanically and/or pneumatically actuated.

The friction clutches 226, 228 are positioned on different shafts in the transmission which may enable the transmission to achieve greater space efficiency and load distribution. However, in other examples, the clutches may be coaxially positioned on the same shaft.

The output interfaces 214 (e.g., splines, flanges, yokes, and the like) may be used to attach the output shaft 224 to downstream components. To elaborate, as indicated via arrows 252, a mechanical connection may be established between the output interfaces and the drive axle assemblies 212. Shafts, joints, gears, chains, combinations thereof, and the like may be used to establish the mechanical connection between the output interfaces and the drive axle assemblies.

It will be appreciated that the transmission 135 may include additional shafts, gears, and/or clutches which may have different layouts, in other examples. For example, the transmission 135 may include a second idler shaft with another clutch mounted thereto and/or an additional shaft that functions as an output shaft. As such, the transmission 135 may have three or more speeds, in other examples. However, increasing the number of available operating gears in the transmission increases the transmission's size and complexity. Therefore, the transmission may specifically be a two-speed transmission to reduce the transmission size, complexity, and likelihood of component degradation. Using a two-speed transmission may be particularly suited for a traction motor due to motor having a wider power band than internal combustion engines, for example.

The storage medium may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

An axis system is provided in FIG. 2A, as well as in FIGS. 2B and 2C, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The propulsion source 105 may be configured to spin the rotor shaft in opposing directions which correspond to forward and reverse drive. Therefore, in such an example, the transmission 135 may be designed to operate with an equal number of forward and reverse driving gear modes, in one example. However, in alternate examples, the transmission may have an asymmetric number of forward and reverse gear ratios.

FIGS. 2B and 2C show mechanical power paths 270 and 280 that occur in the transmission 135 of the vehicle propulsion system 199 in the first operating gear and the second operating gear, respectively. In both FIGS. 2B and 2C, the inverter 115 transfers electrical energy to the propulsion source 105 and the propulsion source generates mechanical power and inputs this power into the transmission 135. However, as previously discussed the inverter 115 may be omitted from the powertrain, in other embodiments.

In both of the mechanical power paths 270 and 280, power travels from the propulsion source 105 propulsion source 105 to the input shaft 213, from the input shaft to the gear 218, from the gear 218 to the gear 220, and from the gear 220 to the shaft 222.

In the power path 270, shown in FIG. 2B, power then travels from the shaft 222 to the gear 234 by way of the first friction clutch 228, from the gear 234 to the gear 236, from the gear 236 to the output shaft 224, and from the output shaft 224 to the drive axle assemblies 212.

On the other hand, in the power path 280, shown in FIG. 2C, power flows by first friction clutch 228 power then travels from the shaft 222 to the gear 230, from the gear 230 to the gear 232, from the gear 232 to the output shaft 224 by way of the second friction clutch 226, and from the output shaft 224 to the drive axle assemblies 212.

The system of FIGS. 1-2C provides for an electric propulsion system, comprising: an electric machine; an inverter electrically coupled to the electric machine; and one or more controllers including executable instructions that cause the controller to generate a state machine configured to control maximum power output of the electric propulsion system, where the state machine be in exactly one of a plurality of states of the state machine at a time, and where the plurality of states include at least one state that permits output power of the electric propulsion system to exceed a rated output power of at least one component of the electric propulsion system and at least one state that permits output power of at least one component of the electric propulsion system to be constrained to less than the rated output of the at least one component. In a first example, the electric propulsion system includes where transitions between the plurality of states is dependent upon electric propulsion system operating conditions. In a second example that may include the first example, the electric propulsion system includes where the electric propulsion system operating conditions include a first threshold temperature. In a third example that may include one or both of the first and second examples, the electric propulsion system includes where the electric propulsion system operating conditions include a second threshold temperature. In a fourth example that may include one or more of the first through third examples, the electric propulsion system includes where the electric propulsion system operating conditions include boost conditions. In a fifth example that may include one or more of the first through fourth examples, the electric propulsion system includes where the plurality of states includes a minimal performance state. In a sixth example that may include one or more of the first through fifth examples, the electric propulsion system includes where the plurality of states includes an inverter derating state. In a seventh example that may include one or more of the first through sixth examples, the electric propulsion system includes where the plurality of states includes two boost performance type states.

Referring now to FIG. 3, a graphic view of an example state machine 300 for managing maximum or peak power output of an electric vehicle propulsion system is shown. State machine 300 is a representation of a mathematical model that may be realized via executable controller instructions that are stored in non-transitory memory, values of variables stored in transitory memory, and operating states of devices and/or actuators. State machine 300 may receive inputs that indicate vehicle operating conditions (e.g., electric machine winding temperature, inverter switch temperatures, bus bar temperatures, vehicle position, positions of other vehicles surrounding the vehicle, vehicle speed, driver demand, ambient temperature, vehicle travel route data, engaged transmission gear, etc). State machine 300 may be considered as a method for controlling maximum vehicle propulsion system output torque or power.

In this example, state machine 300 includes five states 302, 308, 314, 318, and 330, but in other examples, additional or fewer states may be provided. State machine 300 operates such that it may occupy or be in exactly one state at a time. Entry actions (e.g., change an operating state of an actuator, change a value of a variable stored in memory, read a value of a variable stored in memory, determine an operating state of an actuator, etc.) may be performed by state machine 300 when transitioning to and prior to entering a state. Exit actions (e.g., change an operating state of an actuator, change a value of a variable stored in memory, read a value of a variable stored in memory, determine an operating state of an actuator, etc.) may be performed by state machine 300 when transitioning from or exiting from a state. State machine 300 may move from one state (e.g., nominal performance state 302) to a second state (e.g., boost performance type 1 state) via a transition (e.g., transition 332). State machine 300 also includes a state group 340 that is comprised of three states (e.g., 302, 308, and 330) in this example, but in other examples a state group may include additional or fewer groups. The state group 340 is a way to indicate that a state that enters the state group may enter any state within the group. The state group 340 provides a way to minimize the actual total number of transition lines from one state to other states, yet still indicate that the one state may enter or be entered from any state within the state group.

The state machine 300 may operate in cooperation with other control routines to manage maximum or peak power output of vehicle propulsion system 199. For example, another control routine may determine a driver demand torque or power that is requested from the vehicle propulsion system 199. The driver demand torque or power may be a function of driver demand pedal position and vehicle speed. The driver demand torque or power may be supplied to state machine 300 and state machine 300 may output a vehicle propulsion system final driver demand torque or power, which may be a constrained version of the driver demand torque or power that is determined from driver demand pedal position and vehicle speed. For example, if the driver demand torque is 350 Newton-meters according to driver demand pedal position and vehicle speed, state machine 300 may command the vehicle propulsion system to provide 340 Newton-meters torque or some other constrained value that is based on vehicle operating conditions when state machine 300 is constraining vehicle propulsion system 199. Alternatively, state machine 300 may output a driver demand torque or power value that is not to be exceeded for each state of state machine 300, and the driver demand torque or power value that is not to be exceeded for each state may be different for each state. Another control routine external from state machine 300 may receive the driver demand torque or power value that is not to be exceeded from state machine 300, and the external control routine may adjust the driver demand torque or power so that the vehicle propulsion system final driver demand torque or power is equal to or less than the driver demand torque or power value that is not to be exceeded. For example, if driver demand torque is determined to be 350 Newton-meters based on driver demand pedal position and vehicle speed, and if the vehicle propulsion system final driver demand torque is not to exceed 330 Newton-meters, the vehicle propulsion system may be commanded to provide 330 Newton-meters torque by a control routine that receives the vehicle propulsion system final driver demand torque that is not to be exceeded.

In one example, the nominal performance state 302 is a state where driver demand torque or power may be constrained to be less than equal to a first threshold level of driver demand torque or power. The first threshold level of driver demand torque or power may be based on a maximum torque or power that may be output by the vehicle propulsion system continuously (e.g., for longer than a threshold amount of time, such as 10 minutes) without the vehicle propulsion system components exceeding their respective threshold temperatures and/or reverting to a lower output. State machine 300 constrains commanded torque or power and/or output torque or power of the vehicle propulsion system to be less than or equal to the first threshold driver demand torque or power when state machine 300 is in nominal performance state. The commanded torque or power, or output torque or power, of the vehicle propulsion system may be constrained by constraining an amount of electric current that is supplied to propulsion source 105 and/or inverter 115. The vehicle propulsion system commanded torque or power, or alternatively, output torque or power, may be constrained to be less than or equal to the first threshold level by increasing or decreasing the vehicle propulsion system commanded torque or power, or alternatively, increasing or decreasing output torque or power, when transitioning from another state to the nominal performance state 302.

The vehicle propulsion system may operate within the minimal performance state 308 by constraining driver demand torque or power to be less than equal to a second threshold level of driver demand torque or power, where the second threshold level is less than the first threshold level. The second threshold level of driver demand torque or power may be based on a driver demand torque or power that may be output by the vehicle propulsion system with the vehicle propulsion system generating less than a threshold amount of heat during a prescribed amount of time (e.g., 5 minutes). State machine 300 constrains commanded torque or power and/or output torque or power of the vehicle propulsion system to be less than or equal to the second threshold driver demand torque or power when state machine 300 is in minimal performance state 308. The vehicle propulsion system commanded torque or power, or alternatively, output torque or power, may be constrained to be less than or equal to the first threshold level by decreasing the vehicle propulsion system commanded, or output, torque or power when transitioning from another state to the minimal performance state 308.

The vehicle propulsion system may operate within the boost performance type 1 state 330 by constraining driver demand torque or power to be less than equal to a third threshold level of driver demand torque or power, where the third threshold level is greater than the first threshold level. The third threshold level of driver demand torque or power may be based on a maximum torque or power that may be output by the vehicle propulsion system for longer than a first threshold amount of time, but less than continuously (e.g., for longer than 1 minute, but less than 10 minutes). The third threshold level of driver demand torque or power is greater than the first level of driver demand torque or power. State machine 300 constrains commanded torque or power and/or output torque or power of the vehicle propulsion system to be less than or equal to the third threshold driver demand torque or power when state machine 300 is in boost performance type 1 state 330. The vehicle propulsion system commanded torque or power, or output torque or power, may be constrained to be less than or equal to the third threshold level by increasing or decreasing the vehicle propulsion system commanded, or output, torque or power when transitioning from another state to the boost performance type 1 state 330.

The vehicle propulsion system may operate within the boost performance type 2 state 318 by constraining driver demand torque or power to be less than equal to a fourth threshold level of driver demand torque or power, where the fourth threshold level is greater than the third threshold level. The fourth threshold level of driver demand torque or power may be based on a maximum torque or power that may be output by the vehicle propulsion system for longer than a second threshold amount of time, but less than a third threshold amount of time (e.g., for longer than 3 seconds, but less than 2 minutes). The fourth threshold level of driver demand torque or power is greater than the third level of driver demand torque or power. State machine 300 constrains commanded torque or power and/or output torque or power of the vehicle propulsion system to be less than or equal to the fourth threshold driver demand torque or power when state machine 300 is in boost performance type 2 state 318.

In this example, the final state that state machine 300 may occupy is inverter derating state 314. In one example, the inverter derating state 314 is a state where output current of the inverter 115 may be constrained to be less than equal to a first threshold level of electric current. The first threshold level of electric current may be based on specifications of devices within the inverter and other vehicle operating conditions. State machine 300 may constrain current output of the inverter by adjusting on and/or off times of inverter switches that generate AC power from DC power. The commanded electric machine electric current may be constrained by constraining an amount of electric current that is commanded from the inverter. The inverter commanded electric current may be constrained to be less than or equal to the first threshold level of electric current by decreasing the maximum inverter current threshold when transitioning from another state to the inverter derating state 314.

To determine the conditions for transitioning between the various states, vehicle operating conditions may be monitored during select conditions. Specifically, during vehicle calibration, it may be determined that boosted performance may be desired for select vehicle operating conditions. Further, it may be determined that the select vehicle operating conditions may be determined from values of variables. Therefore, the values of the variables may be applied to control transitioning in and out of boost performance types 1 and 2, as well as other states. For example, during vehicle calibration it may be determined that boost performance type 1 or boost performance type 2 may be desirable when the present vehicle is passing a second vehicle, during vehicle launch (e.g., vehicle increasing speed from zero speed), during transmission gear shifting, while a speed of the vehicle is increasing, when the vehicle travels in an unintended direction, during a particular vehicle speed range or window, when road grade exceeds a threshold, and during other vehicle operating conditions. Outputs of the various vehicle sensors may be a basis for determining whether or not vehicle operating conditions are indicative of a request or desire to exit a first particular state and enter a second particular state. Transitions between the various states of state machine 300 may also include pre-emptively derating at least a portion of the vehicle propulsion system 199 according to one or more temperatures within the vehicle propulsion system 199.

The transitions between the various states may occurs as described herein, but it may be appreciated that transitions between the various states is not limited according to the description provided here. A transition from nominal performance state 302 to the minimal performance state 308 may follow arrow 304 in response to a temperature of vehicle propulsion system 199 being equal to or greater than a first threshold temperature. By transitioning from nominal performance state 302 to minimal performance state 308, the vehicle propulsion system 199 may be pre-emptively cooled in the event of the vehicle propulsion system 199 returning to nominal performance state 302 and then entering boost performance type 1 state 330 or entering boost performance type 2 state 318 so that thermal margin may be preserved for operating vehicle propulsion system 199 in boost performance type 1 state 330 or boost performance type 2 state 318. Actions to enter minimal performance state 308 from nominal performance state 302 may include gradually decreasing the requested driver demand torque or power by gradually constraining driver demand torque or power to less than a threshold, or alternatively, by gradually lowering a not to exceed driver demand torque or power value. The driver demand torque or power, or alternatively, the commanded driver demand torque or power, may be constrained to a fixed value or a value that changes based on vehicle operating conditions. State machine 300 may transition from minimal performance state 308 to nominal performance state 302 as indicated by arrow 306 in response to the temperature of vehicle propulsion system 199 being less than the first threshold temperature.

The state machine 300 may exit the nominal performance state 302 and enter boost performance type 1 state as indicated by arrow 332 in response to conditions for entering boost performance type 1 state being met. The conditions may include but are not limited to the vehicle performing a gear shift, the vehicle passing a second vehicle, the vehicle moving in an unintended direction (e.g., a vehicle rolling in a reverse direction after stopping on a hill while the vehicle's transmission is engaged in drive), the vehicle traveling on a road with a grade that is greater than a threshold grade, and vehicle speed increasing. Boost performance type 1 state may have less priority than boost performance type 2 state. Boost performance type 1 state 330 may be entered from nominal performance state 302 when boost performance type 1 state 330 may be desired but may be less urgent than boost performance type 2 state 318. State machine 300 may enter nominal performance state 302 from boost performance type 1 state 330 as indicated by arrow 334 in response to at least one condition for being in boost performance type 1 state 330 not being met. Actions to enter boost performance type 1 state 330 from nominal performance state 302 may include gradually increasing the requested driver demand torque or power by gradually reducing constraining of driver demand torque or power by increasing the threshold, or alternatively, by gradually increasing the not to exceed driver demand torque or power value. State machine 300 may also transition from boost performance type 1 state 330 to minimal performance state 308 as indicated by arrow 336, in response to a temperature of vehicle propulsion system 199 being equal to or greater than a first threshold temperature. By transitioning from boost performance type 1 state 330 to minimal performance state 308, the vehicle propulsion system 199 may be pre-emptively cooled in the event of the vehicle propulsion system 199 enters boost performance type 2 state 318 so that thermal margin for continued operation in boost performance type 2 state 318 may be preserved. Boost performance type 1 state 330 allows the vehicle propulsion system 199 to generate greater amounts of torque and power as compared to operating in the nominal performance state 302.

State machine 300 may enter boost performance type 2 state 318 from nominal performance state 302, minimal performance state 308, or boost performance type 1 state 330 as indicated by arrow 320 during particularly urgent conditions such as passing another vehicle or while the vehicle is turning on to a busy road. State machine 300 may exit boost performance type 2 state 318 and enter nominal performance state 302, minimal performance state 308, or boost performance type 1 state 330 from boost performance type 2 state 318 as indicated by arrow 322 in response to at least one condition for being in boost performance type 2 state 330 not being met. Further, state machine 300 may exit boost performance type 2 state 318 and enter inverter derating state 312 as indicated by arrow 316 in response to a temperature of the vehicle propulsion system 199 exceeding a second threshold temperature, where the second threshold temperature is greater than the first threshold temperature. Actions to enter boost performance type 2 state 318 from nominal performance state 302, boost performance type 1 state 330, or minimal performance state 308 may include gradually increasing the requested driver demand torque or power by gradually reducing constraining of driver demand torque or power by increasing the threshold, or alternatively, by gradually increasing the not to exceed driver demand torque or power value. Boost performance type 2 state 318 allows the vehicle propulsion system 199 to generate greater amounts of torque and power as compared to operating in the boost performance type 1 state 330.

State machine 300 may enter inverter derating state 314 from minimal boost state 308 or boost performance type 2 state 318 as indicated by arrow 316 and arrow 310 in response to a temperature of the vehicle propulsion system 199 exceeding a second threshold temperature, where the second threshold temperature is greater than the first threshold temperature. State machine 300 may exit inverter derating state 314 as indicated by arrow 312 in response to the temperature of vehicle propulsion system 199 is below the second threshold temperature. Actions to enter inverter derating state 314 from minimal performance state 308 or boost performance type 2 state 318 may include gradually decreasing a maximum inverter output electric current.

Thus, state machine 300 allows the vehicle propulsion system to move between several states to control managing of maximum or peak power output of an electric propulsion system. The state machine states may include two boosting states where torque or power output of the electric propulsion system may exceed nominal or rated power output for the electric propulsion system and two states for lowering output of the electric propulsion system to reduce a possibility of electric propulsion system degradation.

The state machine 300 provides for a method for operating a vehicle, comprising: moving between states of a state machine to control a maximum power output of the electric propulsion system, where the state machine includes a plurality of states and permits entry of the state machine to exactly one state of the state machine and the electric propulsion system to exactly one state at a time. In a first example, the method further comprises adjusting one or more control parameters to transition from a first of the plurality of states to a second of the plurality of states. In a second example that may include the first example, the method further comprises receiving inputs and moving between the states in response to the inputs. In a third example that may include one or both of the first and second examples, the method includes where the states include a group of states, and where each state within the group of states may be entered from a state outside of the group of states according to vehicle operating conditions. In a fourth example that may include one or more of the first through third examples, the method includes where the states include a minimal performance state and an inverter derating state. In a fifth example that may include one or more of the first through fourth examples, the method includes where the states also include two boost performance type states. In a sixth example that may include one or more of the first through fifth examples, the method includes where the maximum power output may be increased to be greater than a rated power output when the state machine is in either of the two boost performance type states.

The state machine 300 also provides for a method for operating a vehicle, comprising: constraining a driver demand torque or power for a vehicle propulsion system in response to moving between states of a state machine to control a maximum torque or power output of the electric propulsion system, where the state machine includes a plurality of states and permits entry to exactly one state of the state machine and one electric propulsion system state at a time, and were constraining the driver demand torque or power includes adjusting a maximum commanded driver demand torque or power. In a first example, the method includes where the plurality of states includes a boost performance type 1 state and a boost performance type 2 state. In a second example that may include the first example, the method includes where the driver demand torque is constrained according to a first temperature threshold when the state machine is in the boost performance type 1 state, and where the driver demand torque is constrained according to a second temperature threshold when the state machine is in the boost performance type 2 state. In a third example that may include one or both of the first and second examples, the method includes where the boost performance type 2 state permits a greater maximum torque or power output of the electric propulsion system than the boost performance type 1 state. In a fourth example that may include one or more of the first through third examples, the method includes where the boost performance type 2 state and the boost performance type 1 state are based on vehicle operating conditions that are indicative of urgency to move the vehicle.

A maximum power output control sequence according to the system of FIGS. 1-2C and the state machine of FIG. 3 is shown in FIG. 4. The sequence of FIG. 4 may be generated by the system of FIGS. 1-2C in cooperation with a method represented via the state machine of FIG. 3. The plots of FIG. 4 are aligned in time and the vertical lines represent times of interest in the sequence.

The first plot from the top of FIG. 4 is a plot of requested driver demand torque versus time. The vertical axis represents driver demand torque and driver demand torque increases in the direction of the vertical axis arrow. The horizontal axis represents time and time increases from the left side of the plot to the right side of the plot. Trace 402 represents driver demand torque.

The second plot from the top of FIG. 4 is a plot of commanded driver demand torque (e.g., torque that the electric propulsion system is commanded to generate) versus time. The vertical axis represents commanded driver demand torque and commanded driver demand torque increases in the direction of the vertical axis arrow. The horizontal axis represents time and time increases from the left side of the plot to the right side of the plot. Trace 404 represents commanded driver demand torque.

The third plot from the top of FIG. 4 is a plot of the electric propulsion system power management state versus time. The vertical axis represents electric propulsion system power management state and the numbers listed along the vertical axis are the state identification numbers used to identify the states shown in FIG. 3. The horizontal axis represents time and time increases from the left side of the plot to the right side of the plot. Trace 406 represents the presently activated power management state.

The fourth plot from the top of FIG. 4 is a plot of boost conditions (e.g., conditions where power output of the electric propulsion system may be above maximum power output of the electric propulsion system during nominal operating conditions) versus time. The vertical axis represents boost conditions and boost conditions are indicated along the vertical axis. The horizontal axis represents time and time increases from the left side of the plot to the right side of the plot. Trace 408 represents the presently activated boost condition.

The fifth plot from the top of FIG. 4 is a plot of vehicle propulsion system temperature (e.g., an electric machine winding temperature, inverter switch temperature, inverter power bus temperature, etc.) versus time. The vertical axis represents vehicle propulsion system temperature and vehicle propulsion system temperature increases in the direction of the vertical axis arrow. The horizontal axis represents time and time increases from the left side of the plot to the right side of the plot. Trace 410 represents the vehicle propulsion system temperature. Dashed horizontal line 450 represents a first threshold temperature and dashed horizontal line 452 represents a second threshold temperature.

At time t0, the requested driver demand torque and the commanded driver demand torque are equal. The power management state is in the nominal performance state. The boost condition is none and the vehicle propulsion system temperature is below the first and second threshold temperatures.

At time t1 the requested driver demand torque and the commanded driver demand torque are reduced to zero. The remaining operating conditions are substantially unchanged.

At time t2, the requested driver demand torque and the commanded driver demand torque are increased to begin launching the vehicle from zero speed. The power management state changes from nominal performance to boost performance type 1 state so that vehicle launch may be supported. The boost condition indicates launch and the vehicle propulsion system temperature begins increasing. Between time t2 and time t3, the vehicle shifts gears once and the vehicle propulsion system temperature continues increasing.

At time t3, the vehicle propulsion system temperature exceeds the first threshold. As a result, the power management system changes state to the minimal performance state and the commanded driver demand decreases even though the requested driver demand is substantially unchanged. This may allow the vehicle propulsion temperature to begin cooling. The boost condition remains launch. The requested driver demand and the commanded driver demand are reduced at time t4.

At time t5, the vehicle propulsion system temperature is reduced to below the first temperature threshold 450. Consequently, the power management state is changed from minimal performance to nominal performance. The requested and commanded driver demand torque are zero and the boost condition is none.

At time t6, the requested driver demand and the commanded driver demand are increased by the vehicle's human driver (not shown). The boost condition changes to pass and the power management state changes to boost performance type 2. The vehicle propulsion system temperature begins increasing.

At time t7, the vehicle propulsion system temperature exceeds the second threshold temperature so the power management state is changed to inverter derating state to cool the inverter. The requested driver demand torque is unchanged and the commanded driver demand torque is reduced. The boost condition remains pass.

At time t8, the requested driver demand torque and the commanded driver demand torque are reduced. The boost condition switches to none and the power management state switches to the minimal performance state because the vehicle propulsion system temperature is reduced to less than the second threshold temperature.

At time t9, the vehicle propulsion system temperature falls below the first threshold temperature so the power management state changes to the nominal performance state. The requested driver demand torque and the commanded driver demand torque become equal shortly after time t9. The boost condition remains none.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric propulsion system, comprising:
an electric machine;
an inverter electrically coupled to the electric machine; and
one or more controllers including executable instructions that cause the one or more controllers to generate a state machine configured to control maximum power output of the electric propulsion system, where the state machine is in exactly one of a plurality of states at a time, where transitions between the plurality of states occur automatically based on vehicle operating conditions, and where the plurality of states include at least one state that permits output power of the electric propulsion system to exceed a rated output power of at least one component of the electric propulsion system and at least one state that permits output power of at least one component of the electric propulsion system to be constrained to less than the rated output power of the at least one component.

2. The electric propulsion system of claim 1, where transitions between the plurality of states is dependent upon electric propulsion system operating conditions.

3. The electric propulsion system of claim 2, where the electric propulsion system operating conditions include a first threshold temperature.

4. The electric propulsion system of claim 3, where the electric propulsion system operating conditions include a second threshold temperature.

5. The electric propulsion system of claim 4, where the electric propulsion system operating conditions include boost conditions.

6. The electric propulsion system of claim 1, where the plurality of states includes a nominal performance state and a minimal performance state.

7. The electric propulsion system of claim 1, where the plurality of states includes an inverter derating state.

8. The electric propulsion system of claim 7, where the plurality of states includes two boost performance type states.

9. A method for operating a vehicle, comprising:
moving, via a controller, a state of a state machine between a plurality of states to control a maximum power output of an electric propulsion system, where the state machine includes the plurality of states and permits entry to exactly one state at a time, where each state within the plurality of states is automatically entered according to vehicle operating conditions including temperature compared to temperature thresholds.

10. The method of claim 9, further comprising adjusting one or more control parameters to transition from a first of the plurality of states to a second of the plurality of states.

11. The method of claim 9, further comprising receiving inputs and moving between the plurality of states in response to the inputs.

12. The method of claim 9, where the states include a minimal performance state and an inverter derating state.

13. The method of claim 12, where the states also include two boost performance type states.

14. The method of claim 13, where the maximum power output may be increased to be greater than a rated power output when the state machine is in either of the two boost performance type states.

15. A method for operating a vehicle, comprising:
constraining a driver demand torque or power for a vehicle propulsion system by limiting an amount of electric current supplied to the vehicle propulsion system in response to moving between states of a state machine, to control a maximum torque or power output of an electric propulsion system via the state machine, where the state machine includes a plurality of states and permits entry to exactly one state at a time, where transitions between the plurality of states occur automatically based on vehicle operating conditions and where constraining the driver demand torque or power includes adjusting a maximum commanded driver demand torque or power by outputting a maximum threshold value for the torque or power.

16. The method of claim 15, where the plurality of states includes a boost performance type 1 state and a boost performance type 2 state.

17. The method of claim 16, where the driver demand torque is constrained according to a first temperature threshold when the state machine is in the boost performance type 1 state, and where the driver demand torque is constrained according to a second temperature threshold when the state machine is in the boost performance type 2 state.

18. The method of claim 17, where the boost performance type 2 state permits a greater maximum torque or power output of the electric propulsion system than the boost performance type 1 state.

19. The method of claim 18, where the boost performance type 2 state and the boost performance type 1 state are based on vehicle operating conditions that are indicative of urgency to move the vehicle.

* * * * *